United States Patent

[11] 3,595,367

[72] Inventor Alphonse W. Faure
 Philadelphia, Pa.
[21] Appl. No. 850,014
[22] Filed Aug. 14, 1969
[45] Patented July 27, 1971
[73] Assignee C.S.S. Machine & Tool Co., Inc.
 Philadelphia, Pa.

[54] PUSH PLATE ASSEMBLY FOR LARGE DIAMETER GLASSWARE
 1 Claim, 5 Drawing Figs.
[52] U.S. Cl. .................................................... 198/24, 198/31
[51] Int. Cl. ............................................... B65g 47/24
[50] Field of Search ........................................... 198/31, 24, 222, 221

[56] References Cited
UNITED STATES PATENTS

| | | | |
|---|---|---|---|
| 2,094,497 | 9/1937 | Ross | 198/24 X |
| 3,249,200 | 5/1966 | Rowe | 198/24 |
| 3,375,915 | 4/1968 | Fouse | 198/24 |

Primary Examiner—Joseph Wegbreit
Assistant Examiner—Bruce H. Stoner, Jr.
Attorney—Paul & Paul ABSTRACT: To accommodate for large diameter bottles, the push plate of a 90° pushout in glass forming apparatus is provided with a long push finger which is automatically raised from the horizontal or push position to a vertical or clearance position during the retraction stroke of the piston.

INVENTOR.
Alphonse W. Faure

INVENTOR.
Alphonse W. Faure

3,595,367

PUSH PLATE ASSEMBLY FOR LARGE DIAMETER GLASSWARE

CROSS-REFERENCE TO RELATED APPLICATION

The disclosure in the present application represents a modification of the 90° pushout disclosed in my earlier filed patent application, Ser. No. 744,263, filed June 17, 1968, entitled "Pushout for Glassware forming Machinery." The modification disclosed in the present application is intended to be used where gallon jugs, or other large diameter glassware, is to be formed. The disclosure of my earlier filed application, Ser. No. 744,263, now U.S. Pat. No. 3,559,537, is incorporated herein by reference.

BACKGROUND OF THE INVENTION

The invention relates to glassware forming apparatus, and particularly to that portion of the apparatus which relates to transferring the hot newly formed glassware articles from the dead plate on to the moving conveyor leading to the lehr. The invention relates particularly to the so-called 90° pushout in which a fluid (preferably pneumatic) motor is used to extend and retract a piston or cylinder, thereby to move a push plate inwardly on the retraction stroke. When the push plate is pushed outwardly on the extension stroke, the push plate is facing the dead plate on which a hot newly formed bottle or other glassware has just been placed. One or more fingers, which project forwardly from the push plate, are moved on the extension stroke into a position behind the bottle on the dead plate. The 90° pushout mechanism is then rotated through 90° in a horizontal plane and in so doing the push finger pushes the bottle through an arcuate path off the dead plate and on to a moving conveyor. The push plate and its projecting finger are then retracted, after which the pushout device is returned horizontally through 90° to its starting position. The cycle is then repeated.

In my earlier filed patent application, Ser. No. 744,263, means are disclosed for adjusting the length of the extension stroke of the piston, and means are also disclosed for adjusting the pusher fingers, thereby to accommodate to the different sizes of bottle ware. Where the glassware is of substantially larger diameter, as for example, a gallon jug, the length of the piston extension stroke must be substantially shortened, and in addition the pusher finger must be lengthened, if the pusher finger is to engage the gallon jug (or other large bottle) at the proper point of its periphery. It has been found, when the piston stroke is thus shortened, and the pusher finger is thus lengthened, that after the retraction stroke, when the pushout is returned horizontally 90° to its starting position, the long pusher finger will not clear the next newly formed bottle on the dead plate. Heretofore, the answer to this problem has been to delay the dropping of the next large-diameter bottle on to the dead plate until after the 90° pushout has been returned to its starting position. This obviously slows up the operation of the machine.

SUMMARY OF THE INVENTION

The object of the present invention is to provide a simple modification to a 90° pushout which will enable the glassware forming apparatus to be operated at its full speed even when gallon jugs, or other large diameter glassware, are being formed.

The foregoing object is accomplished, in accordance with the present invention, by providing means for automatically raising the long pusher finger (which is used to push gallon jugs or other large size glassware from the dead plate to the conveyor) from a horizontal to a vertical position during the retraction stroke of the 90° pushout so that when the pushout is rotated 90° horizontally to return the pushout to its starting position, the long pusher finger will clear the next bottle which has been placed by the glassware forming apparatus on the dead plate. After the return of the pushout to its starting position, when the pusher plate is moved outwardly during the next extension stroke, the pusher finger is automatically lowered from the vertical to the horizontal position, so as to be in position to engage and push the next jug or bottle.

DESCRIPTION OF THE PREFERRED EMBODIMENT

Figure 1:
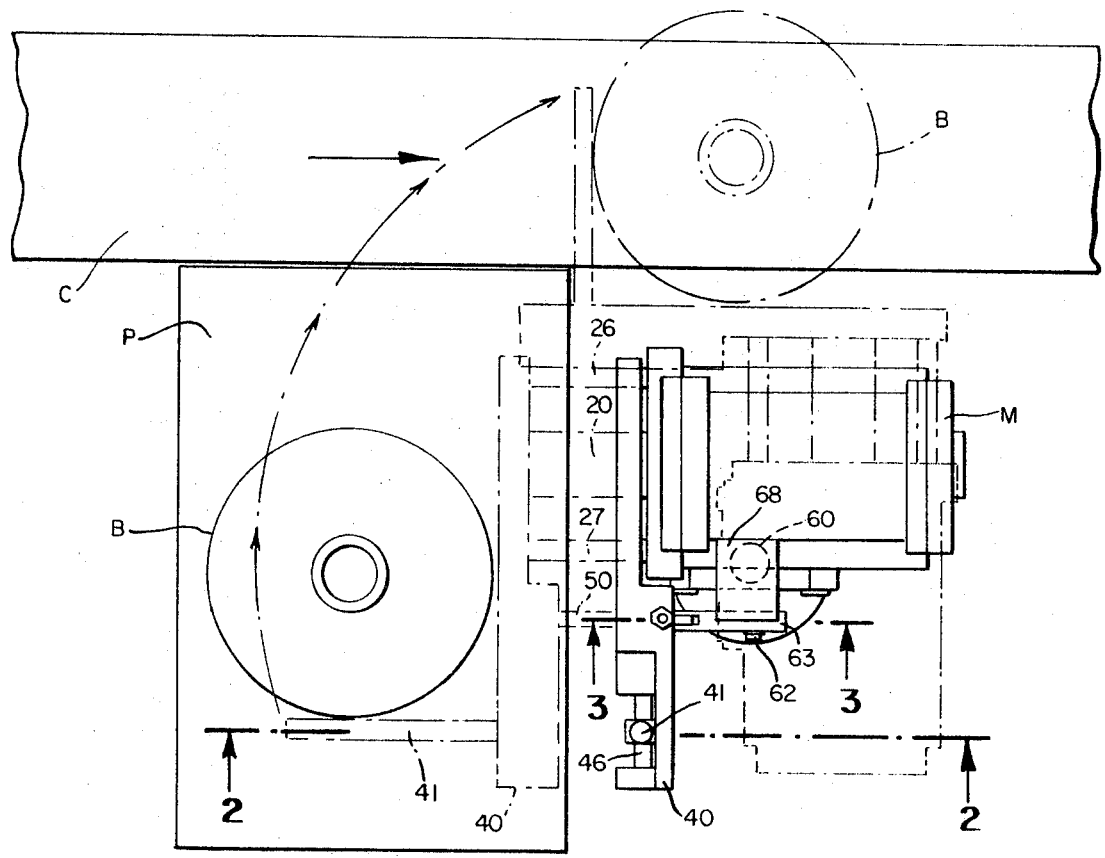
FIG. 1 is a diagrammatic plan view showing in solid lines the position of the fluid motor assembly before the piston is extended, and showing in phantom how the push plate is extended and rotated horizontally through 90°.

Referring now to FIG. 1, there is shown diagrammatically in solid lines a fluid motor assembly M mounted for oscillatory movement on the oscillatory shaft 60. The fluid motor M (preferably pneumatic) has an extensible and retractable piston 20 whose direction of movement is assisted by the guide rods 26 and 27, one on either side of the piston. Carried on the forward end of the piston 20 and guide rods 26, 27, and screwed thereto as by screws 42—44 (FIG. 4) is push plate 40. An elongated rod or pusher finger 41 is carried on the push plate 40 and projects therefrom, either horizontally forward (FIG. 5) or vertically upward (FIG. 4) according to cam control mechanism to be described.

When the piston 20 is extended toward the dead plate P, the finger 41 is in its horizontal forwardly extending position and is adapted almost to engage the hot newly formed gallon jug or bottle B. Gallon jug B is of larger diameter than the bottles ordinarily being produced. For the purposes of discussion of the present invention, the gallon jug B may be assumed to have a diameter of 6½ inches. This compares to the ordinary bottle which has a diameter of about 2½ inches.

When the fluid motor assembly M is rotated 90° clockwise, as viewed in FIG. 1, by the 90° rotational movement of shaft 60 on which the motor M is mounted, the jug B is moved along an arcuate path indicated generally by the arrows in FIG. 1 and the bottle B is thereby transferred to the conveyor C, which is moving from left to right as viewed in FIG. 1. Having deposited the jug or bottle B on the conveyor C in the position shown in phantom in FIG. 1, and after a very short interval to allow the bottle B to move to the right to clear the finger 41, the fluid motor M operates to retract the piston 20. After piston retraction, the fluid motor assembly M is then returned 90° counterclockwise by the rotational movement of shaft 60, thereby returning the fluid motor assembly to its starting position. The cycle is then repeated in timed relationship with the remainder of the glassware-forming apparatus, as well understood by those in the art.

The fluid motor M is adjustable as to length of piston stroke by means disclosed in my earlier filed Pat. application, Ser. No. 744,263. Assuming that the center of the bottle dropped on the dead plate is to remain the same irrespective of whether the bottle-forming apparatus is producing large diameter bottles, such as gallon jugs, or smaller diameter bottles, it will be seen that the push plate 40 of the 90° pushout cannot be moved as far toward the push plate when the larger jugs are being made as when the smaller diameter bottles, such as 10 oz. soft drink bottles, are being made. It is also apparent that the push finger 41 is required to be longer for larger diameter bottles, in order to engage the periphery of the bottle at a point which is in line with the center axis of the bottle.

Since for larger diameter bottles, such as gallon jugs, the piston stroke is shorter and the pusher finger 41 is longer, it will be seen that after the gallon jug has been moved to the conveyor C, the short-stroke retraction of the push plate 40 will be insufficient to allow the long push finger 41 to clear the next gallon jug when the 90° pushout pivots 90° counterclockwise back to its starting position. Accordingly, as previously mentioned, the art heretofore has delayed dropping the next gallon jug on the dead plate until after the pushout mechanism has returned through 90° to its starting position.

In accordance with the present invention, when gallon jugs (or other large diameter bottles) are being produced, the push plate used for the smaller bottles is removed and a modified push plate 40 is secured in its place. The new push plate 40 is shown in perspective in FIG. 4. As there shown, the push plate 40 is secured to the piston 20 and guide rods 26, 27 by the screws 42, 43 and 44, respectively. The push plate 40 has an offset portion 45 to one side which carries a shaft 46 mounted for rotational movement in bushings 49. The extra-long push finger 41 is fixed, as by hub 48 and setscrew, to the shaft 46 for pivotal movement in response to rotational movement of the shaft 46.

Figure 3:
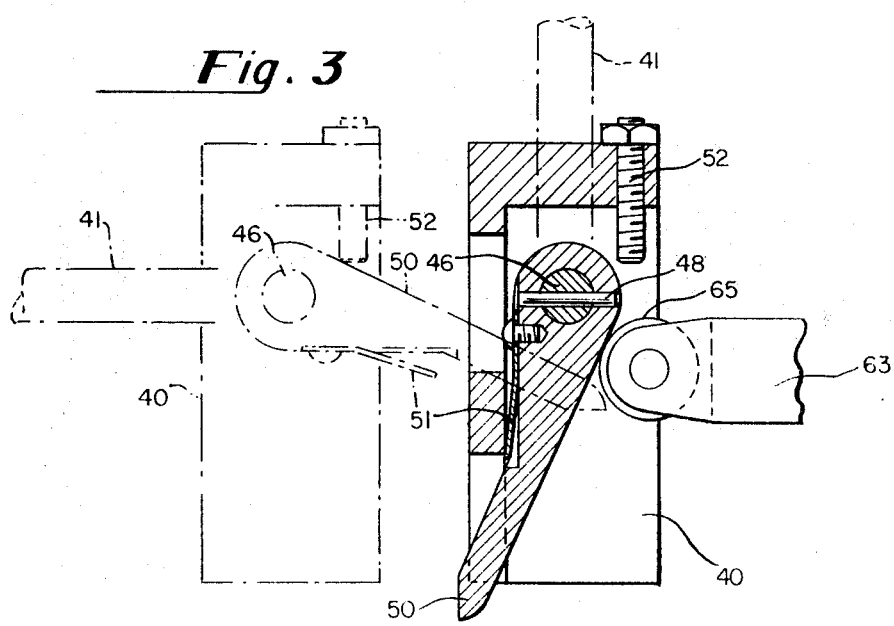
FIG. 3 is an enlarged view, partly broken away, looking along the lines 3-3 of FIG. 1 and showing in solid lines the position of the cam lever when the piston is in retracted position, and showing the position of the cam lever when the piston is in its extended position.

Also secured to shaft 46 as by pin 48 (FIG. 3), is a cam lever 50. Secured to cam lever 50 is a spring 51, shown to be a leaf spring.

Mounted, as by screws 61, on the side of the fluid motor housing is an extension block 68. Secured adjustably to extension block 68, as by an adjustment screw 62, is an arm 63 carrying at its forward end a cam roller 65. Cam roller 65 is on alignment with the cam lever 50, so that the start of the retraction stroke of the piston 20 the upper surface of cam lever 50 will come into engagement with the cam roller 65, as seen in phantom in FIG. 3, and as the retraction stroke continues the cam lever 50 will be forced downward into the position shown in solid line in FIG. 3, thereby rotating the shaft 46 through a little more than 90°, thereby carrying the push finger 41 from the horizontal position shown in phantom in FIG. 3 to a position just beyond the vertical, as shown in dotted lines in the solid-line representation portion of FIG. 3. Accordingly, when the fluid motor assembly M is returned counterclockwise through 90°, by counterclockwise rotation of the oscillatory shaft 60, the push finger 41, being in a vertical position, avoids engagement with the next gallon jug (or other large diameter bottle) which has already been deposited on the dead plate P.

Figure 2:
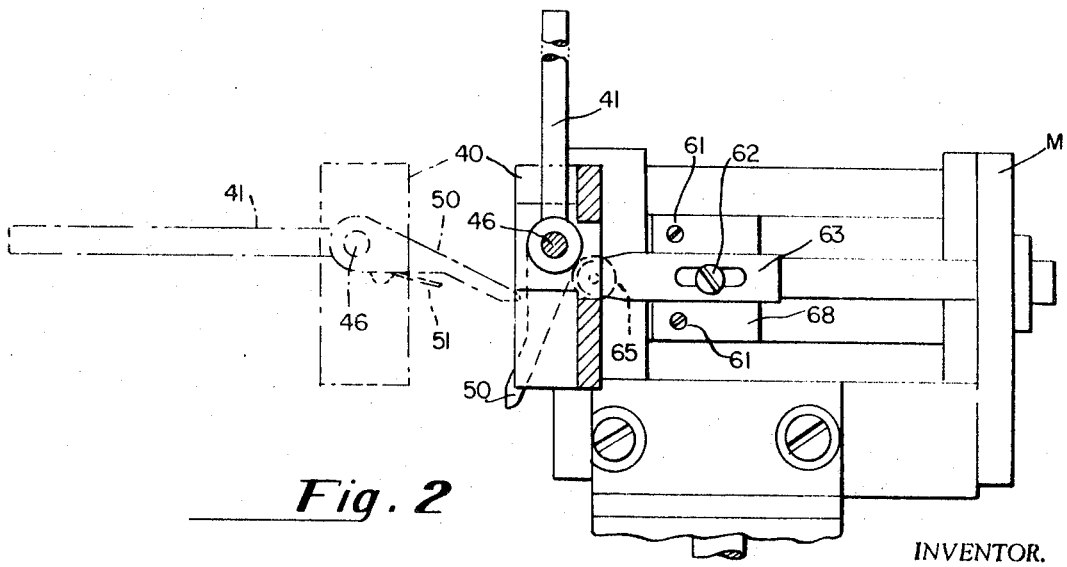
FIG. 2 is an elevational view along the lines 2-2 of FIG. 1 showing, in accordance with the present invention, the push finger in solid line in vertical position when the piston is in retracted position, and the push finger in phantom in horizontal position when the piston is extended.
Figure 4:
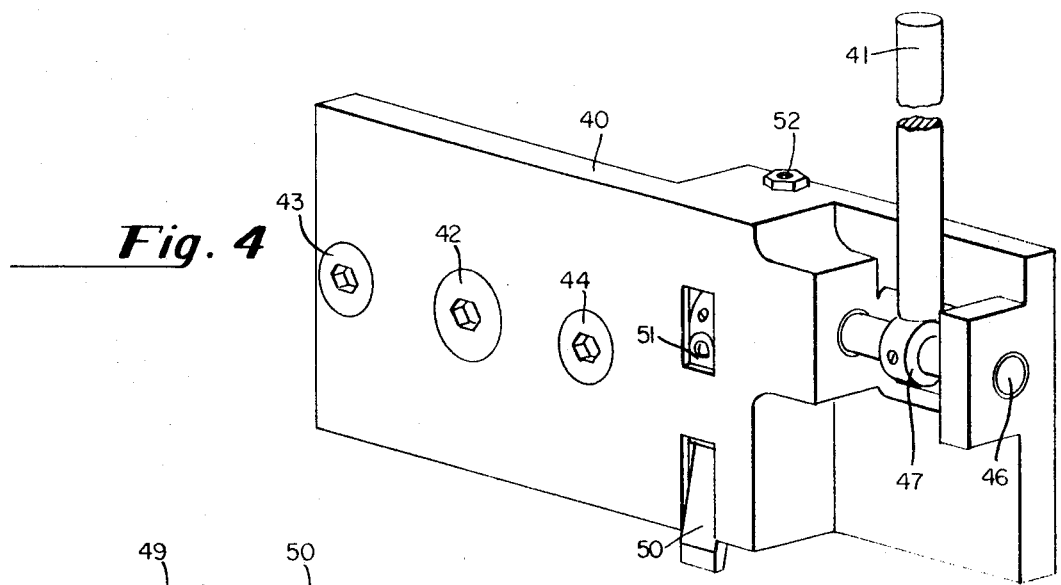
FIG. 4 is a perspective view of the new push plate showing the push finger mounted on the camshaft, and showing the push finger and cam lever in the positions which they occupy when the piston is in retracted position.
Figure 5:
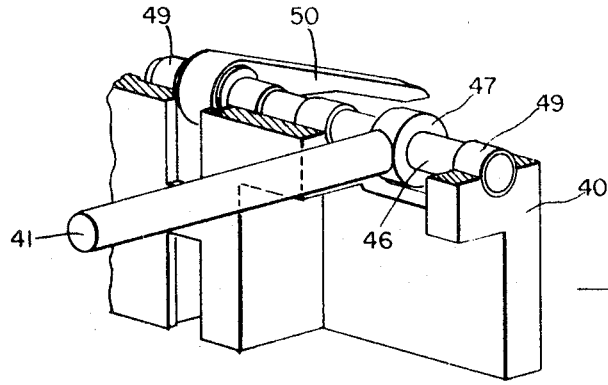
FIG. 5 is a view, broken away along the axis of the camshaft, showing the positions of the push finger and cam lever after the push plate has been pushed forward on the extension stroke of the piston.

When, at the start of the next cycle, the piston 20 is extended outwardly carrying the push plate 40 with it, the cam lever 50 returns from the vertical position, shown in the solid-line representations of FIGS. 2 and 4, to the horizontal position shown in FIG. 5. The function of leaf spring 51 is to move the cam lever 50 (counterclockwise as viewed in FIG. 3) through a sufficient distance to assure that the vertical push finger 41 has passed, from an over-the-center vertical position, through vertical center. Thereafter, the weight of the push finger 41 will assure its falling to the horizontal position. An adjustable stop 52 limits the extent to which the cam lever 50 can move in the counterclockwise direction and thus controls the horizontal positioning the push finger 41.

The operation will now be summarized. At the start of the cycle, the fluid motor assembly M is in the position shown in solid line in FIGS. 1 and 2. Push finger 41 is in an over-the-center vertical position, being held there by the cam roller 65 which is pressing against the cam lever 50. At the start of the extension stroke of the piston 20, the cam lever 50 moves away from the cam roller 65, and spring 51 operates to move cam lever 50 counterclockwise, thereby to move finger 41 counterclockwise beyond the vertical center. As the forward movement of the piston 20 continues, the push finger 41 drops down to the horizontal position, thereby carrying the cam lever 50 counterclockwise to the position shown in phantom in FIG. 2. The push finger 41 is now in the position shown in plan view in FIG. 1, ready to engage the new gallon jug B. The fluid motor assembly M now rotates 90° clockwise on shaft 60, and push finger 41 pushes the jug B along the arcuate path and on to the conveyor C. The piston 20 is now retracted. During the retraction stroke, the cam lever 50 is brought into engagement with the cam roller 65, and the cam lever 50 is forced downward, thereby rotating the shaft 46 and thereby raising the push finger 41 pivotally from the horizontal to the vertical position. The fluid motor assembly M is now rotated counterclockwise 90° to return the mechanism to the start position, thereby completing the cycle.

While a preferred embodiment of the invention has been shown and described, modifications and alternatives will readily occur to those having knowledge in the art without departing from the scope of the disclosure herein.

What I claim is:

1. In a 90° pushout mechanism for transferring newly formed glassware articles from a dead plate of a glassware forming machine to a conveyor, said 90° pushout mechanism including:
   a. a fluid motor having a housing, an extendible member therein, and means for moving said extendible member cyclically through forward extension and rearward retraction strokes;
   b. means for rotating cyclically said housing and said extendible member through an angle of approximately 90° in a substantially horizontal plane in coordinated relation with the cyclical extension and retraction strokes of said extendible member;
   c. a push plate mounted in lateral position at the forward end of said extendible member;
   d. said push plate having an extension which projects laterally beyond the housing of said extendible member;
   e. a rotatable shaft carried on said lateral extension of said push plate;
   f. an elongated push finger mounted on said rotatable shaft;
   g. means for moving pivotally said push finger through an angle of approximately 90° from a horizontal forward position to a vertical upward position during the retraction stroke of said extendible member, said means comprising:
      g-1. a cam lever fixed to said shaft in said lateral extension of said push plate;
      g-2. spring bias means for assisting said cam lever toward a generally horizontal position rearwardly toward said housing;
      g-3. a cam roller adjustably mounted on the side of said housing in the vertical plane of said cam lever;
      g-4. said cam roller being adapted to be engaged by said horizontally disposed rearwardly extending cam lever during the retraction stroke of said extendible member to force said cam lever downwardly toward vertical position, thereby to rotate said shaft through approximately 90°, thereby to raise said push finger from a forward horizontal to an upward vertical position.

PO-1050
(5/69)

UNITED STATES PATENT OFFICE
CERTIFICATE OF CORRECTION

Patent No. 3,595,367              Dated July 27, 1971

Inventor(s) Alphonse W. Faure

It is certified that error appears in the above-identified patent and that said Letters Patent are hereby corrected as shown below:

Column 1, line 24, after "push plate" insert --outwardly on the extension stroke and to return the push plate".

Column 3, line 37, change "on" to --in--.

Signed and sealed this 11th day of January 1972.

(SEAL)
Attest:

EDWARD M. FLETCHER, JR.
Attesting Officer

ROBERT GOTTSCHALK
Acting Commissioner of Patents